(12) United States Patent
Uemura et al.

(10) Patent No.: US 10,877,269 B2
(45) Date of Patent: Dec. 29, 2020

(54) HEAD-MOUNTED DISPLAY APPARATUS, INSPECTION SUPPORTING DISPLAY SYSTEM, DISPLAY METHOD, AND RECORDING MEDIUM RECORDING DISPLAY PROGRAM

(71) Applicant: OLYMPUS CORPORATION, Hachioji (JP)

(72) Inventors: Tatsuyuki Uemura, Tachikawa (JP); Hirofumi Endo, Tokyo (JP); Takao Shibasaki, Hokkaido (JP); Yoji Osanai, Hachioji (JP); Seiji Tatsuta, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/510,443

(22) Filed: Jul. 12, 2019

(65) Prior Publication Data

US 2020/0018957 A1 Jan. 16, 2020

(30) Foreign Application Priority Data

Jul. 13, 2018 (JP) ................................ 2018-133468

(51) Int. Cl.
*G02B 27/01* (2006.01)
*G06T 7/00* (2017.01)

(52) U.S. Cl.
CPC .......... *G02B 27/017* (2013.01); *G06T 7/0004* (2013.01); *G06T 7/0012* (2013.01); *G02B 2027/014* (2013.01); *G02B 2027/0178* (2013.01); *G02B 2027/0187* (2013.01); *G06T 2207/30121* (2013.01)

(58) Field of Classification Search
CPC ............ G02B 27/017; G02B 2027/014; G02B 2027/0178; G02B 2027/0187; G06T 7/004; G06T 7/0012; G06T 2207/30121
See application file for complete search history.

(56) References Cited

U.S. PATENT DOCUMENTS

| | | | | |
|---|---|---|---|---|
| 2005/0234333 | A1* | 10/2005 | Takemoto | G06T 7/80 600/426 |
| 2012/0263449 | A1* | 10/2012 | Bond | G02C 11/10 396/420 |
| 2013/0050432 | A1* | 2/2013 | Perez | G06F 3/017 348/47 |
| 2016/0091729 | A1* | 3/2016 | Ollila | H04N 5/2253 348/208.99 |

(Continued)

FOREIGN PATENT DOCUMENTS

JP 2017022668 A 1/2017

*Primary Examiner* — Ariel A Balaoing
(74) *Attorney, Agent, or Firm* — Volpe Koenig

(57) ABSTRACT

A head-mounted display apparatus includes a display device configured to form a virtual display region by a virtual image of an electronic video in a visual field of a user, an image pickup device configured to pick up an image of an image pickup range including a part or a whole of visual field of the user, and a processor. The processor determines, with signal processing for a picked-up image by the image pickup device, an observation necessary range in the picked-up image and performs display control for displaying, in the virtual display region, an image portion of the observation necessary range in the picked-up image.

9 Claims, 17 Drawing Sheets

(56) References Cited

U.S. PATENT DOCUMENTS

| | | | | |
|---|---|---|---|---|
| 2016/0260261 A1* | 9/2016 | Hsu | ................. | B23K 9/173 |
| 2017/0098449 A1* | 4/2017 | Horiuchi | ................. | G10L 15/26 |
| 2018/0239957 A1* | 8/2018 | Tang | ................. | G06T 7/11 |
| 2018/0246563 A1* | 8/2018 | Kunitomo | ............ | G02B 27/017 |
| 2018/0329212 A1* | 11/2018 | Aiki | ................. | G02B 27/0172 |
| 2020/0103980 A1* | 4/2020 | Katz | ................. | G06F 3/167 |

\* cited by examiner

FIG. 14

| [A] MAINTENANCE TARGET | [B] WORK PROCESS | [C] [WORK INFORMATION DATABASE] WORK CONTENT | [D] WORK INFORMATION WEARABLE TERMINAL DEVICE (MOVING IMAGE) |
|---|---|---|---|
| TARGET 1: SCISSORS | FIRST PROCESS: BRUSHING | FIRST WORK: TOOL CONFIRMATION | ACT OF HOLDING UP BRUSH IN FRONT OF AUXILIARY CAMERA, ETC. |
| | | SECOND WORK: FIRST PART BRUSHING | WORK IMAGE (NUMBER OF TIMES, TIME PERIOD) |
| | | THIRD WORK: SECOND PART BRUSHING | WORK IMAGE (NUMBER OF TIMES, TIME PERIOD) |
| | SECOND PROCESS: FLOWING WATER CLEANING | FIRST WORK: TOOL FLOW RATE CONFIRMATION | ACT OF TURNING FAUCET, ETC. |
| | | SECOND WORK: FIRST PART FLOWING WATER CLEANING | WORK IMAGE (TIME PERIOD) |
| | | THIRD WORK: SECOND PART FLOWING WATER CLEANING | WORK IMAGE (TIME PERIOD) |
| | THIRD PROCESS: WIPING | FIRST WORK: TOOL CONFIRMATION | ACT OF HOLDING UP TOOL IN FRONT OF AUXILIARY CAMERA, ETC. |
| | | SECOND WORK: FIRST PART WIPING | WORK IMAGE (NUMBER OF TIMES, TIME PERIOD) |
| | | THIRD WORK: SECOND PART WIPING | WORK IMAGE (NUMBER OF TIMES, TIME PERIOD) |
| | FOURTH PROCESS: CHEMICAL STERILIZATION | FIRST WORK: TOOL CONFIRMATION | ACT OF HOLDING UP TOOL IN FRONT OF AUXILIARY CAMERA, ETC. |
| | | SECOND WORK: FIRST PART SPRAYING, DRYING | WORK IMAGE (NUMBER OF TIMES, TIME PERIOD) |
| | | THIRD WORK: SECOND PART SPRAYING, DRYING | WORK IMAGE (NUMBER OF TIMES, TIME PERIOD) |
| TARGET 2: ○○○ | FIRST PROCESS: □□□ | FIRST WORK: TOOL CONFIRMATION | ACT OF HOLDING UP TOOL IN FRONT OF AUXILIARY CAMERA, ETC. |
| | | SECOND WORK: FIRST PART □□ | WORK IMAGE |
| | | THIRD WORK: SECOND PART △○▽ | WORK IMAGE |
| | SECOND PROCESS: △△△ | FIRST WORK: TOOL CONFIRMATION | ACT OF HOLDING UP TOOL IN FRONT OF AUXILIARY CAMERA, ETC. |
| | | SECOND WORK: FIRST PART △△△ | WORK IMAGE |

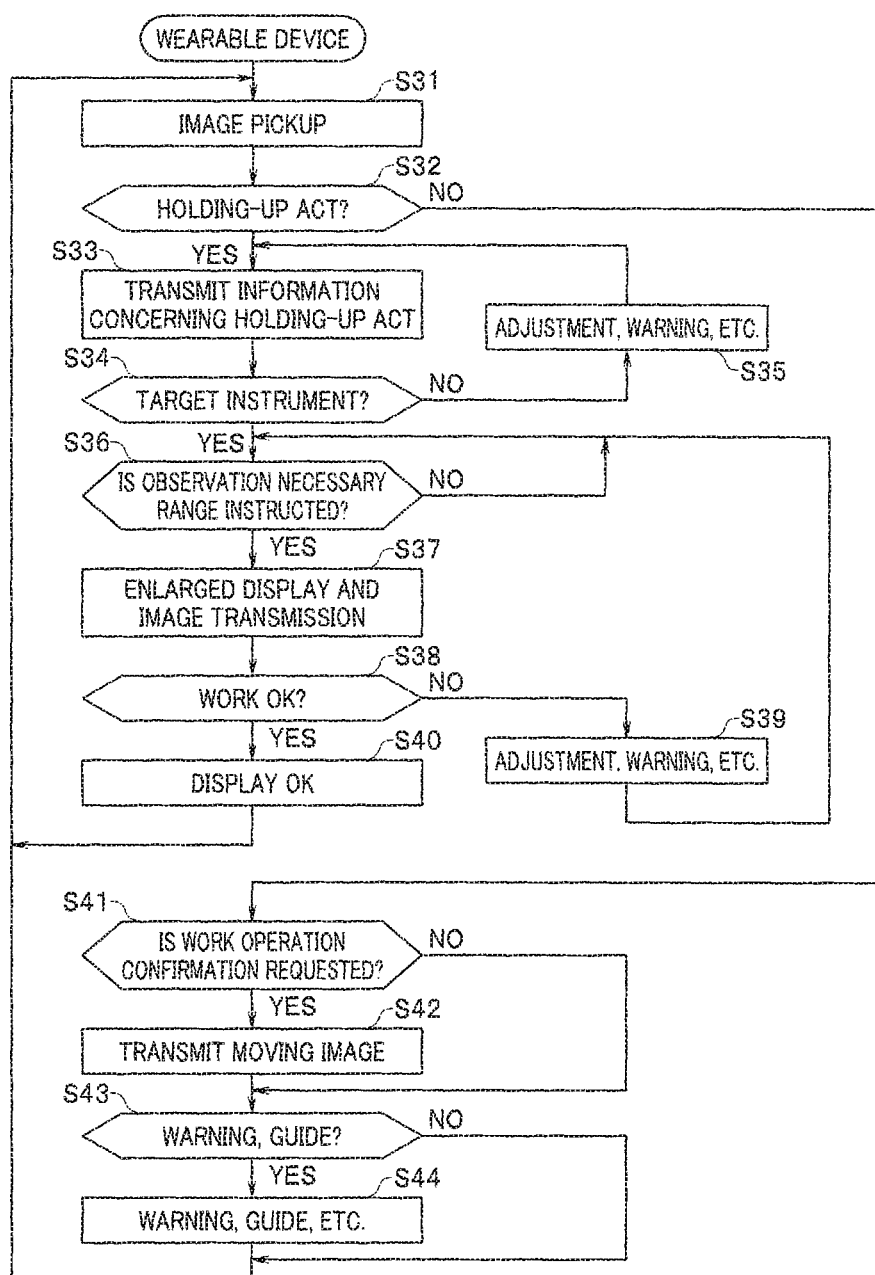

HEAD-MOUNTED DISPLAY APPARATUS, INSPECTION SUPPORTING DISPLAY SYSTEM, DISPLAY METHOD, AND RECORDING MEDIUM RECORDING DISPLAY PROGRAM

CROSS REFERENCE TO RELATED APPLICATION

This application is based upon and claims the benefit of priority from the prior Japanese Patent Application No. 2018-133468 filed in Japan on Jul. 13, 2018; the entire contents of which are incorporated herein by reference.

BACKGROUND OF THE INVENTION

Field of the Invention

The present invention relates to a head-mounted display apparatus, an inspection supporting display system, a display method, and a display program that surely and efficiently support work.

Description of Related Art

There has been developed a head-mounted display apparatus such as an eyeglass-type display apparatus adopting a see-through optical system. The head-mounted display apparatus adopting the see-through optical system is capable of displaying various kinds of information without blocking a visual field of an outside world. As the head-mounted display apparatus of the type, there has also been developed an eyeglass-type display apparatus small in size and light in weight and configured to house an electric circuit in one temple of an eyeglass and dispose a virtual display region in a part of a field of view of a wearer. The virtual display region is obtained by, for example, displaying, on a display section disposed in a part of a region in the visual field, an information image (a virtual image of an electronic video) generated by a display controller.

Such an eyeglass-type display apparatus can give, to the wearer, an outside world visual field obtained through a lens of an eyeglass (hereinafter referred to as real visual field) and a visual field obtained in the virtual display region (hereinafter referred to as virtual display visual field). A user can visually recognize a situation in the outside world in the real visual field and, at the same time, visually recognize the information image displayed on the display section in the virtual display visual field and acquire various kinds of information.

Such a display apparatus can also display, for example, auxiliary information concerning a situation of the outside world in the virtual display region and is also useful as a work supporting apparatus that surely and efficiently supports various kinds of work. A head-mounted display apparatus attached with a camera that photographs a state of work in order to more effectively support work has also been used.

Note that Japanese Patent Application Laid-Open Publication No. 2017-22668 discloses a wearable display capable of performing position adjustment in a left-right direction and an up-down direction and flap angle adjustment of a display member.

Note that, in the head-mounted display apparatus of the eyeglass type or the like, the head-mounted display apparatus also moves according to a movement of a face. A photographing range of the attached camera corresponds to an orientation of the face. A target of photographing by the attached camera is considered to be often work performed by the wearer. Therefore, the camera is considered to only have to be attached to the head-mounted display apparatus to direct an optical axis direction of a camera lens to a substantial center of the real visual field.

SUMMARY OF THE INVENTION

A head-mounted display apparatus according to an aspect of the present invention includes: a display device configured to form a virtual display region by a virtual image of an electronic video in a visual field of a user; an image pickup device configured to pick up an image of an image pickup range including a part or a whole of visual field of the user; and a processor. The processor determines, with signal processing for a picked-up image by the image pickup device, an observation necessary range in the picked-up image and performs display control for displaying, in the virtual display region, an image portion of the observation necessary range in the picked-up image.

An inspection supporting display system according to an aspect of the present invention includes: a head-mounted display apparatus including: a display device configured to form a virtual display region by a virtual image of an electronic video in a visual field of a user; and an image pickup device configured to pick up an image of an image pickup range including a work target of the user; and a processor. The processor determines, with signal processing for a picked-up image by the image pickup device, an observation necessary range including the work target in the picked-up image and performs display control for enlarging and displaying an image portion of the observation necessary range in the picked-up image.

A display method according to an aspect of the present invention includes: forming a virtual display region by a virtual image of an electronic video in a visual field of a user; picking up an image of an image pickup range including a part or a whole of visual field of the user; determining, with signal processing for a picked-up image acquired by the image pickup, an observation necessary range in the picked-up image; and performing display control for displaying, in the virtual display region, an image portion of the observation necessary range in the picked-up image.

A recording medium recording a display program according to an aspect of the present invention records a display program for causing a computer to: form a virtual display region by a virtual image of an electronic video in a visual field of a user; pick up an image of an image pickup range including a part or a whole of visual field of the user; determine, with signal processing for a picked-up image acquired by the image pickup, an observation necessary range in the picked-up image; and execute display control for displaying, in the virtual display region, an image portion of the observation necessary range in the picked-up image.

BRIEF DESCRIPTION OF THE DRAWINGS

FIG. 14 is an explanatory diagram showing an example of information recorded in a DB;

FIG. 16 is a flowchart showing operation of a wearable terminal device.

DETAILED DESCRIPTION OF PREFERRED EMBODIMENTS

Embodiments of the present invention are explained in detail below with reference to the drawings.

First Embodiment

Figure 1:
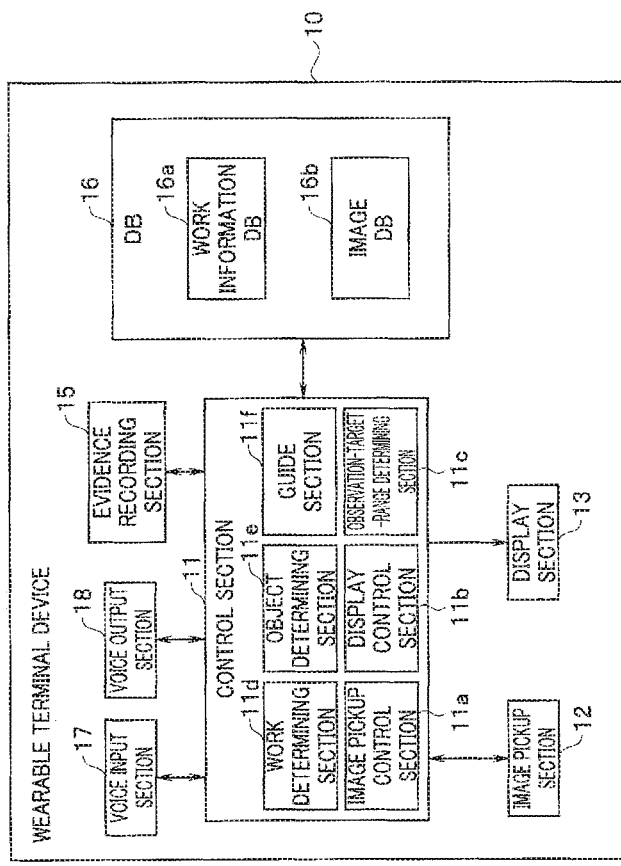
FIG. 1 is a block diagram showing a head-mounted display apparatus according to a first embodiment of the present invention.
Figure 2:
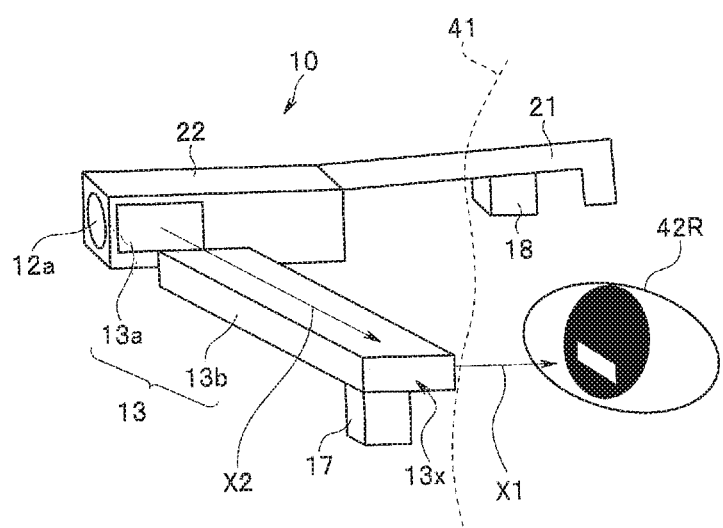
FIG. 2 is an explanatory diagram schematically showing an example of an exterior of the head-mounted display apparatus shown in FIG. 1.

FIG. 1 is a block diagram showing a head-mounted display apparatus according to a first embodiment of the present invention. FIG. 2 is an explanatory diagram schematically showing an example of an exterior of the head-mounted display apparatus shown in FIG. 1. FIG. 2 shows an example in which the head-mounted display apparatus is configured by an eyeglass-type display apparatus, which is a wearable terminal device.

The head-mounted display apparatus in the embodiment obtains a visual field (a real visual field) in which an image (a real visual field image) by direct sensing or sensing via an optical system of light from an observation object in a real world is obtained and a visual field (a virtual display visual field) obtained in a virtual display region formed by a display image (a virtual image of an electronic video) of a display section to which an image signal is given. In the embodiment, the head-mounted display apparatus includes an image pickup section, an angle of view of which is a sufficiently wide angle, and can display a picked-up image obtained by the image pickup section performing image pickup on the display section as a virtual image of an electronic video. In this case, in the embodiment, for example, an image portion of details or the like of work, on which an operator considers that sure observation should be performed, (hereinafter referred to as observation necessary range) is automatically determined and an enlarged image of the observation necessary range is displayed to facilitate confirmation of the details of the work and make it possible to effectively support the work.

A wearable terminal device 10 includes a control section 11. The control section 11 controls respective sections of the wearable terminal device 10. The control section 11 may be configured by a processor including a CPU and operate according to a program stored in a not-shown memory and control the respective sections. A part of the control section 11 may be replaced with a hardware electronic circuit.

The wearable terminal device 10 includes an image pickup section 12. The image pickup section 12 is configured by, for example, a not-shown image sensor. An image pickup control section 11a is provided in the control section 11. The image pickup control section 11a controls driving of the image pickup section 12 and captures a picked-up image acquired by the image pickup section 12. The image pickup section 12 is configured to pick up an image of an observation target with an image pickup range set in a range including, for example, a substantially entire region of a visual field of a wearer who wears the wearable terminal device 10 and output a picked-up image to the control section 11.

The control section 11 is configured to be able to apply compression processing to the picked-up image acquired by the image pickup section 12 and give the picked-up image after the compression to an evidence recording section 15 and record the picked-up image.

A display control section 11b is provided in the control section 11. The display control section 11b executes various kinds of processing concerning display. The display control section 11b can be configured by, for example, a video controller or a display controller and may be configured to be able to move from the control section 11. The display control section 11b controls display of a display section 13. The display control section 11b can also give the picked-up image acquired by the image pickup section 12 to the display section 13 and cause the display section 13 to display the picked-up image. The display control section 11b can also cause the display section 13 to display an information image acquired from the evidence recording section 15.

A not-shown operation section is provided in the wearable terminal device 10. The operation section is configured by not-shown switches, buttons, and the like and configured to receive user operation and supply an operation signal based on the user operation to the control section 11. The control section 11 operates based on the operation signal supplied from the operation section. Note that, in the example shown in FIG. 2, a voice input section 17 configured by a microphone is adopted as the operation section. The voice input section 17 is configured to collect ambient sound and supply a collected voice signal to the control section 11. The control section 11 is configured to be able to receive operation of a user through voice recognition processing for voice collected by the voice input section 17. In this way, the control section 11 is configured to be able to control the respective sections according to utterance of the wearer or the like.

A voice output section 18 is provided in the wearable terminal device 10. The voice output section 18 is configured to be controlled by the control section 11 to be able to output warning sound and various messages as voice.

In the embodiment, the wearable terminal device 10 includes a database (DB) 16 that stores various kinds of information for performing work support. The DB 16 includes, for example, a work information DB 16a that stores work information and an image DB 16b that stores image information. The work information DB 16a includes various kinds of information concerning a plurality of kinds of work. The image DB 16b is an image data set related to the various kinds of information recorded in the work information DB 16a.

An object determining section 11e determines and detects, based on the image data acquired by the image pickup section 12 and information accumulated in the DB 16 in advance, an object that satisfies predetermined conditions such as a type, a part, a shape, a size, the number of pieces, and a state of a predetermined object included in the image data. Note that the object determining section 11e is also capable of determining, using, for example, an autofocus mechanism, from a relation between a distance between the image pickup section and the object and an image pickup device size, a size of the object according to a size of the object imaged on a light receiving surface of the image pickup device.

A work determining section 11d is configured to perform, based on, for example, the image data acquired by the image pickup section 12, the information accumulated in the DB 16 in advance, determination result information and the like acquired by the object determining section 11e, confirmation and determination of a type of executed work and various inspection items concerning the work. Note that the determination performed by the work determining section 11d includes, for example, determination of a type of a tool used for the work and determination of types of respective kinds of work.

A guide section 11f is configured to generate, based on the image data acquired by the image pickup section 12 and the information accumulated in the DB 16 in advance, guide information for performing guide display concerning executed work, guide display of work that should be performed next, and the like. The guide information is displayed on the display section 13 by the display control section 11b.

The control section 11 is configured to cause, using the image data acquired by the image pickup section 12 and the information accumulated in the DB 16, the evidence recording section 15 to record the work determined by the determination of the work determining section 11d and work information related to the work in association with each other.

FIG. 2 is a diagram for explaining an exterior of the wearable terminal device 10 shown in FIG. 1. FIG. 2 shows an example in which the wearable terminal device 10 adopts, as an optical system that simultaneously obtains a real visual field and a virtual display visual field, a see-through optical system that obtains the real visual field via a transparent thing such as a lens of eyeglasses or air. As the see-through optical system, there are, for example, a see-through optical system that makes light from the display section and light from the real visual field incident on an eye using a half mirror and a see-through optical system that adopts a pupil splitting scheme capable of sensing, using a display section smaller than a size of a pupil, an image of the real visual field (a real visual field image) even in the virtual display region formed by the display section. In the embodiment, an example is explained in which a pupil splitting see-through optical system is used. However, any see-through optical system may be adopted if the real visual field and the virtual display visual field are simultaneously obtained.

The wearable terminal device 10 includes a supporting section for attaching a housing, which incorporates a circuit shown in FIG. 1, to a part of a body of the user. The wearable terminal device 10 is displaceable according to a movement of a face of the user. For example, when the wearable terminal device 10 is configured as an eyeglass type, as shown in FIG. 2, a temple portion of an eyeglass frame 21 functions as the supporting section. The entire wearable terminal device 10 moves according to a movement of a face 41 of the user.

A circuit housing section 22, in which respective circuits configuring the control section 11, the image pickup section 12, the evidence recording section 15, and the database (DB) 16 and a part of the display section 13 are housed, is attached to a part of the eyeglass frame 21. An image pickup lens 12a configuring the image pickup section 12, which pickups up an image of a range including an entire visual field of the wearer, is disposed at a distal end of the circuit housing section 22. An optical image from an object is given to an image pickup device of the image pickup section 12 provided in the circuit housing section 22 via the image pickup lens 12a. A picked-up image based on the object optical image can be acquired by the image pickup device.

In the example shown in FIG. 2, the image pickup lens 12a is provided in the circuit housing section 22 attached to a distal end of the temple portion of the eyeglass frame 21. The temple portion faces substantially the same orientation as an orientation of the face 41 of the person. The image pickup section 12 is capable of picking up an image of the object in a visual field range including, for example, substantially an entire visual field by a right eye 42R and a not-shown left eye of the person. Consequently, the image pickup section 12 is capable of acquiring, as a picked-up image, an image corresponding to a work state observed by the person.

A light guide section 13b supported by the circuit housing section 22 is provided on a front side of a right lens of left and right lenses fit in left and right rims of the eyeglass frame 21. A display panel 13a, which emits video light toward an incident surface of the light guide section 13b, is disposed on a side surface of the circuit housing section 22. The display section 13 is configured by the display panel 13a and the light guide section 13b. An emission surface of the light guide section 13b is disposed in a position in a front of the right eye 42R and corresponding to a part of a region of the right lens in a state in which the person wears the eyeglass frame 21 on the face 41.

The display control section 11b housed in the circuit housing section 22 gives a video signal processed by the control section 11 to the display section 13. The display section 13 emits video light based on the video signal from the display panel 13a toward an incident surface of the light guide section 13b. In FIG. 2, a direction that a display surface of the display panel 13a faces is indicated by an arrow X2. The video light is guided in the light guide section 13b as indicated by an arrow X2. A not-shown light refraction member (a prism, etc.), which bends the light guided in the arrow X2 direction in the light guide section 13b and guides the light in an arrow X1 direction, is disposed at an end portion 13x in the light guide section 13b. The direction of the light guided in the light guide section 13b is changed in the arrow X1 direction by the light refraction member.

The light is emitted to the right eye 42R side of the face 41. In this way, an information image (a virtual image of an electronic video) based on the video signal from the control section 11 is visually recognized in the virtual display region sensed at a predetermined distance from the right eye 42R in a part of a visual field formed by the right eye 42R.

In the visual field range of the right eye 42R, the light guide section 13b is configured at small width equal to or smaller than, for example, 4 mm. The right eye 42R is capable of observing an observation object in a front without being blocked by the light guide section 13b. In other words, the eyeglass-type display apparatus is configured not to prevent the observation object from being directly observed in a see-through manner and to be able to simultaneously observe the observation object by the direct observation and an information image seen in the virtual display region in a part of the visual field. For example, during various kinds of work, the user wearing the wearable terminal device 10, which is the eyeglass-type display apparatus, is capable of directly observing a situation of work and, at the same time, observing an information image based on a procedure manual or the like of the work. Moreover, since the wearable terminal device 10 is a hands-free apparatus, hand and foot motions are not limited in the work and the observation. Therefore, it is possible to observe the information image freely using both hands without spoiling workability. Note that, since conditions are different depending on uses and scenes of use, width of a member configuring the light guide section 13b can be set as appropriate.

Figure 3A:
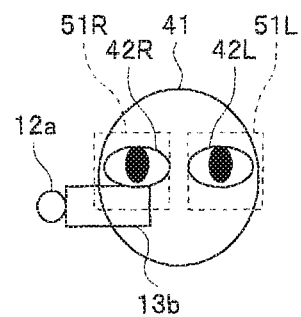
FIG. 3A is an explanatory diagram showing a positional relation between respective sections of a wearable terminal and a face.

FIG. 3A is an explanatory diagram showing a positional relation between the respective sections of the wearable terminal device 10 and the face.

As shown in FIG. 3A, the display section 13 enables visual recognition of an information image acquired from the display control section 11b with the light guide section 13b disposed in the front of the right eye 42R of the face 41. Broken lines respectively surrounding the right eye 42R and a left eye 42L in FIG. 3A indicate visual fields 51R and 51L by the left and right eyes 42R and 42L.

Figure 3B:
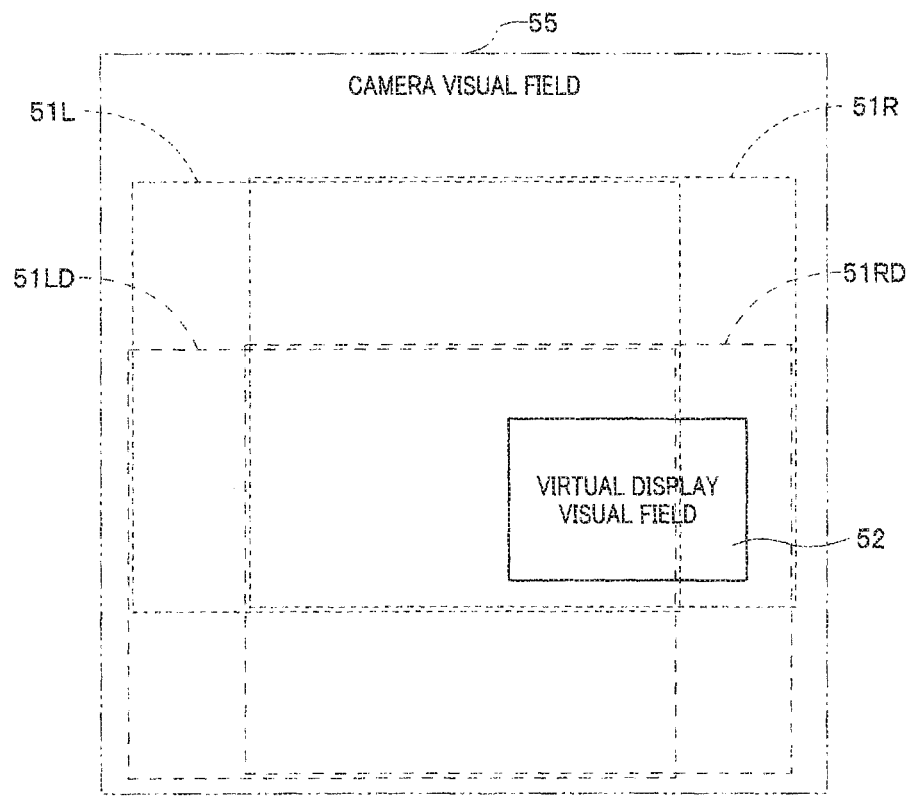
FIG. 3B is an explanatory diagram for explaining a visual field.

FIG. 3B is an explanatory diagram for explaining the visual fields. A left visual field 51L indicates a visual field by the left eye 42L. A right visual field 51R indicates a visual field by the right eye 42R. The left visual field 51L is a real visual field by light passed through a not-shown left lens (which may be transparent glass, or glass may be absent). The right visual field 51R is a real visual field by light passed through a not-shown right lens (which may be transparent glass, or glass may be absent). Note that the right visual field 51R and the left visual field 51L include regions overlapping each other. A virtual display visual field 52 by light from the emission surface of the light guide section 13b is provided in a part of the right visual field 51R. In the virtual display visual field 52, display of a virtual image is performed in a position a predetermined distance away from the right eye 42R.

As shown in FIG. 3B, in the embodiment, an image pickup range (a visual field range), where an image is picked up by the image pickup section 12, is shown as a camera visual field 55. Note that, in an example shown in FIG. 3B, the camera visual field 55 by the image pickup section 12 includes all regions of the left and right visual fields 51L and 51R and includes an entire range of the virtual display visual field 52.

The left and right visual fields 51L and 51R are real visual fields in which an operator wearing the wearable terminal device 10 can sense an observation target via a see-through optical system. The virtual display visual field 52 is an artificial visual field in which the operator can visually recognize an information image acquired from the display control section 11b of the wearable terminal device 10. Therefore, the operator wearing the wearable terminal device 10 can visually recognize the information image in the virtual display visual field 52 while confirming a work target or the like in an observation range around a visual line direction substantially in a front and freely using both hands to perform work requiring attention.

Further, in FIG. 3B, a left visual field 51LD and a right visual field 51RD obtained when visual lines of the right eye 42R and the left eye 42L are directed downward without moving the face 41 are shown. In this case, since the face 41 is not moved, a range of the camera visual field 55 does not change.

In the embodiment, the image pickup section 12 is capable of performing photographing at a sufficiently wide angle such that, even when the operator moves only the visual lines without moving the face 41 and performs work or the like, a state of the work can be photographed. In the embodiment, an observation necessary range is automatically determined from a picked-up image and an enlarged image of the observation necessary range is displayed.

In order to determine such an observation necessary range, in the embodiment, an observation-target-range determining section 11c is provided in the control section 11. The observation-target-range determining section 11c can determine the observation necessary range using image processing on the picked-up image acquired from the image pickup section 12 and determination results of the work determining section 11d and the object determining section 11e.

Figure 4:
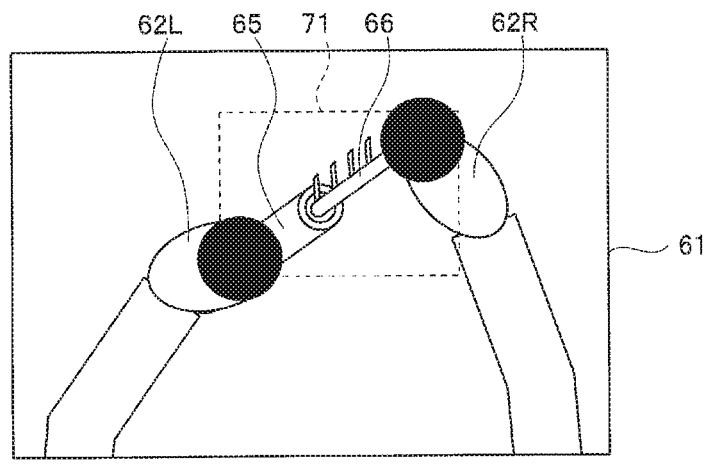
FIG. 4 is an explanatory diagram for explaining determination of an observation necessary range by an observation-target-range determining section.

FIG. 4 is an explanatory diagram for explaining the determination of an observation necessary range by the observation-target-range determining section 11c. FIG. 4 shows a picked-up image 61 acquired by the image pickup section 12. The picked-up image 61 shows a result obtained by picking up an image of a state in which the operator holds a pipe 65 with a left hand 62L, inserts a brush 66 held by a right hand 62R into the pipe 65, and cleans an inside of the pipe 65 with the brush 66.

The object determining section 11e can determine and detect the hands 62L and 62R of the operator, the pipe 65, and the brush 66 with the information of the DB 16 and an image analysis of the picked-up image 61. With the information of the DB 16 and a result of work determination performed to the point, the work determining section 11d can determine that the picked-up image 61 is an image pickup result of an implementation state of a cleaning process for the pipe 65 and the cleaning process for the pipe 65 is currently performed. The observation-target-range determining section 11c sets, based on results of the detections, a range including an object set as a target in a work process being implemented as a range that should be observed in the cleaning process, that is, an observation necessary range 71 (a broken line in FIG. 4). The observation-target-range determining section 11c gives information concerning the observation necessary range 71 to the display control section 11b.

The display control section 11b is configured to, when the information concerning the observation necessary range 71 is given, perform display control for enlarging a portion of the observation necessary range 71 in the picked-up image 61 and displaying the portion in an entire region of the display screen of the display section 13. Consequently, an enlarged image of the observation necessary range 71 is displayed in the virtual display visual field 52. The operator can confirm, in a sufficient size, an image of the observation necessary range 71, that is, an image of the portion confirmed in the cleaning work.

Note that, in the determination of the observation necessary range 71, the observation-target-range determining section 11c may set, as a condition for the determination, a condition that an image portion of the pipe 65 and the brush 66 is located in a predetermined range in the picked-up image 61. For example, when the operator desires to confirm details of work in the virtual display visual field 52, the operator disposes the pipe 65 and the brush 66 in a predetermined position in the camera visual field 55 with both the hands 62L and 62R (hereinafter referred to holding-up act). As a result of performing the holding-up act, the image portion of the pipe 65 and the brush 66 is located in a predetermined range in the picked-up image 61. The observation-target-range determining section 11c is capable of relatively easily determining the observation necessary range 71.

The observation-target-range determining section 11c may be programmed to detect a fingertip of the left hand 62L and a fingertip of the right hand 62R indicated by black circles in FIG. 4 and set a range surrounded by the detected fingertips as the observation necessary range 71. For example, the observation-target-range determining section 11c may detect an immobile object supported by a hand and detect a mobile object and, when a distal end of the mobile object touches the immobile object, set a predetermined range including the contact portion as an observation necessary range. For example, when a work process being implemented is evident, the observation-target-range determining section 11c may set a range including a tool used in the work process as an observation necessary range. The observation-target-range determining section 11c may add, to the determinations, a condition that the holding-up act is detected.

Further, the observation-target-range determining section 11c may be configured to determine an observation necessary range with machine learning. In this case, the observation-target-range determining section 11c includes a not-shown memory and includes, in the memory, a dictionary configuring an inference engine. The dictionary is configured by a network, that is, an inference model obtained by completion of learning in the machine learning.

Figure 5:
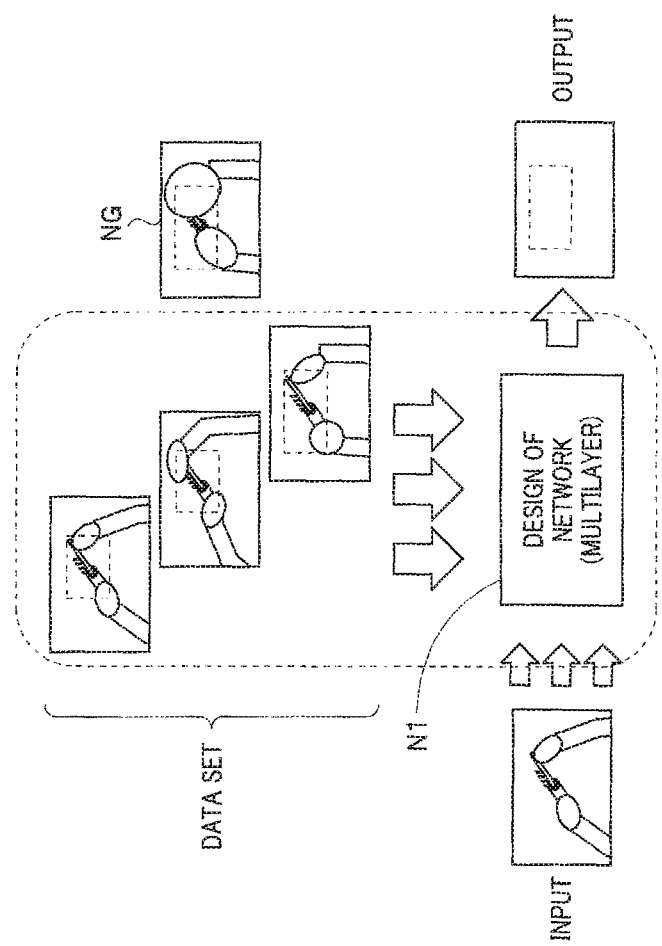
FIG. 5 is an explanatory diagram for explaining a generation method for a dictionary used when the observation necessary range is determined by machine learning.

FIG. 5 is an explanatory diagram for explaining a generation method for a dictionary used when an observation necessary range is determined by the machine learning. In FIG. 5, a large volume of data sets corresponding to an input and an output are given to a predetermined network N1 as data for learning. A data set in a broken line in FIG. 5 indicates teacher data of an image suitable as the observation necessary range (an OK image). A data set outside the broken line indicates teacher data of an image unsuitable as the observation necessary range (an NG image). The OK image is an image in which a relation between the pipe 65 and the brush 66 in FIG. 4 is relatively clear. The NG image is an image in which the pipe 65 and the brush 66 are hidden by a hand and a relation between the pipe 65 and the brush 66 is unclear.

By setting the OK image and the NG image as the teacher data and giving the large volume of data sets to the network N1, a network design of the network N1 is determined such that a relation between an input in FIG. 5 and an output corresponding to the input, the relation indicating a range of the data set (a broken line portion), is obtained with high reliability. Note that publicly-known various networks may be adopted as the network N1 adopted for the machine learning. For example, a R-CNN (regions with CNN features), an FCN (fully convolutional networks), or the like using a CNN (convolution neural network) may be used. An inference model may be acquired by adopting a method of not only deep learning but also publicly-known various machine learnings. The network N1 learned in the way is usable as an inference model and stored in a not-shown memory of the observation-target-range determining section 11c.

The observation-target-range determining section 11c determines, using the inference model (the dictionary) stored in the memory, whether an observation necessary range is present in the picked-up image and outputs information indicating an image position of the observation necessary range to the display control section 11b. In this way, enlarged display of the observation necessary range on the virtual display visual field 52 is enabled by the display control section 11b.

Figure 6:
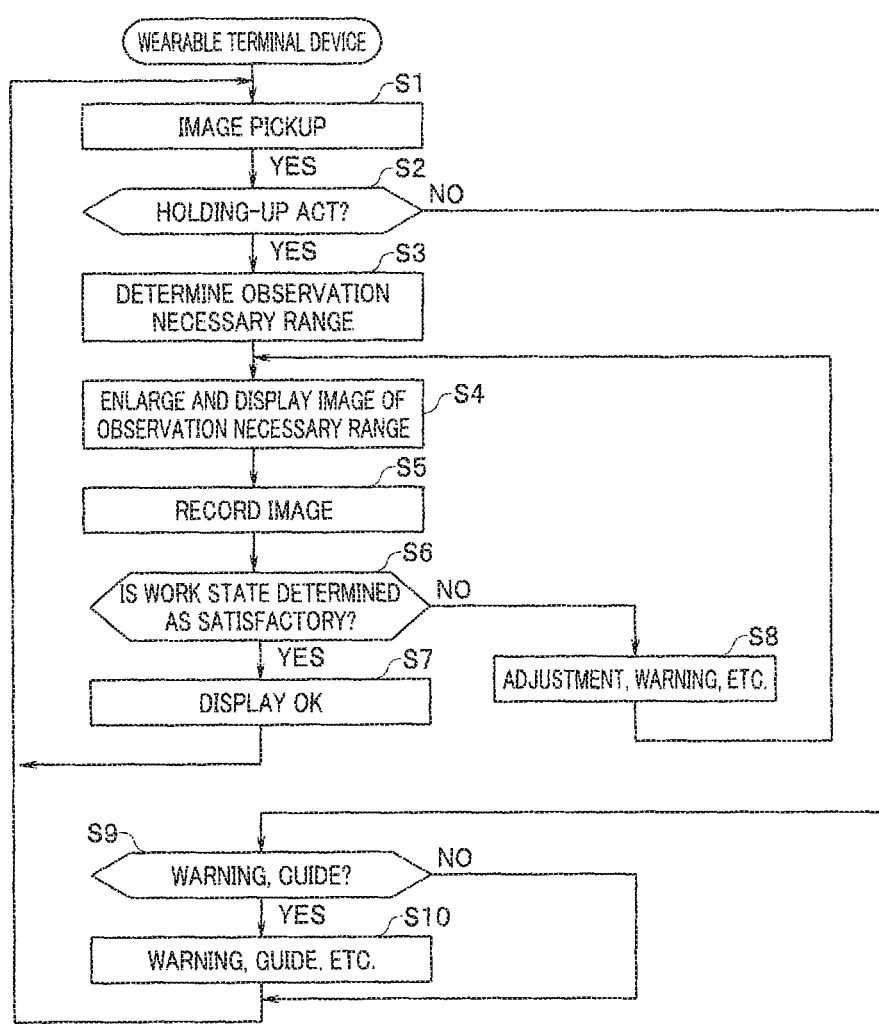
FIG. 6 is a flowchart for explaining operation in the first embodiment.
Figure 7:
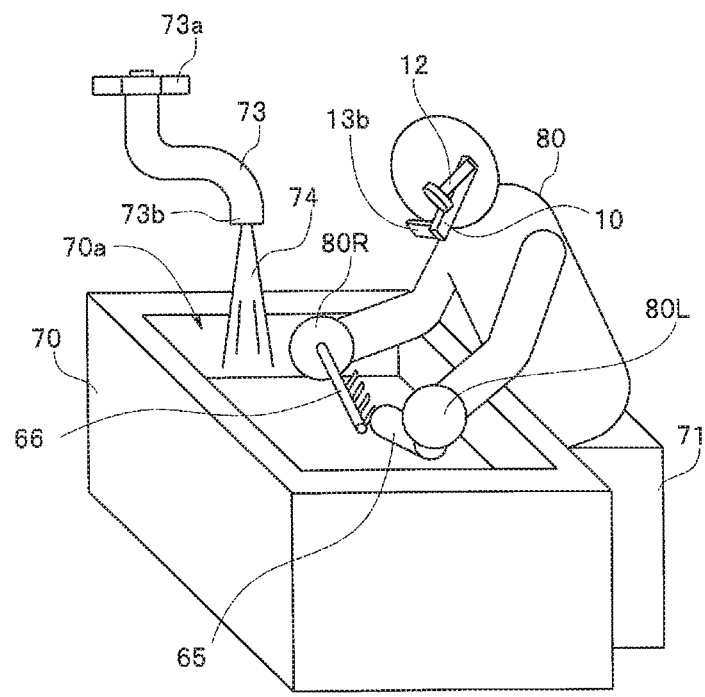
FIG. 7 is an explanatory diagram showing an example of work performed using a wearable terminal device.
Figure 8:
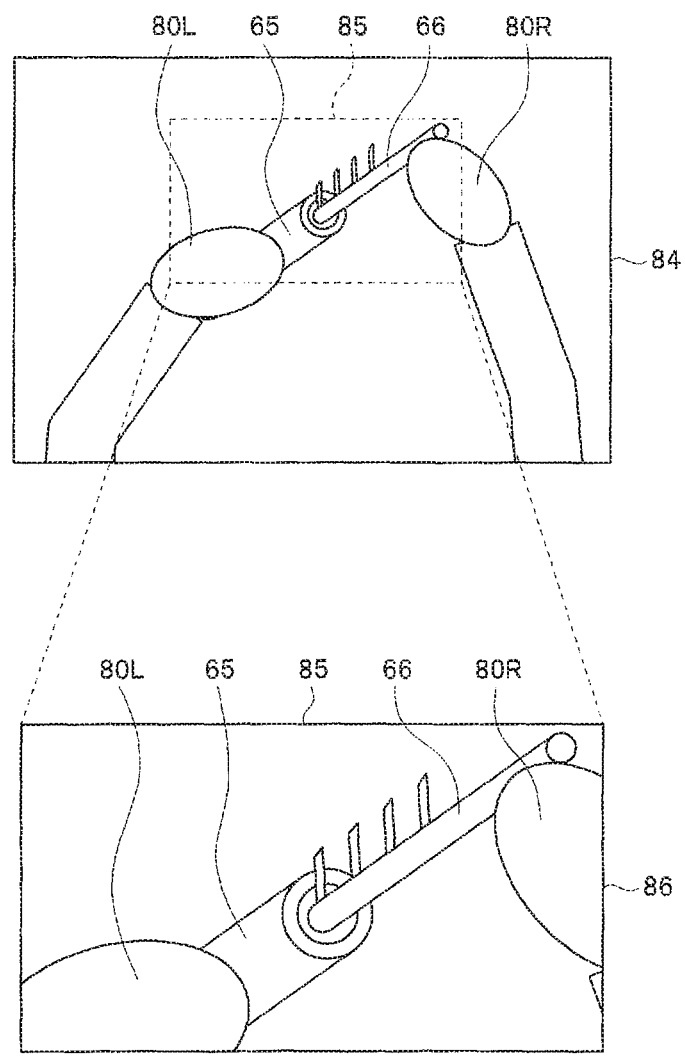
FIG. 8 is an explanatory diagram for explaining a virtual image of an electronic video during work.
Figure 9:
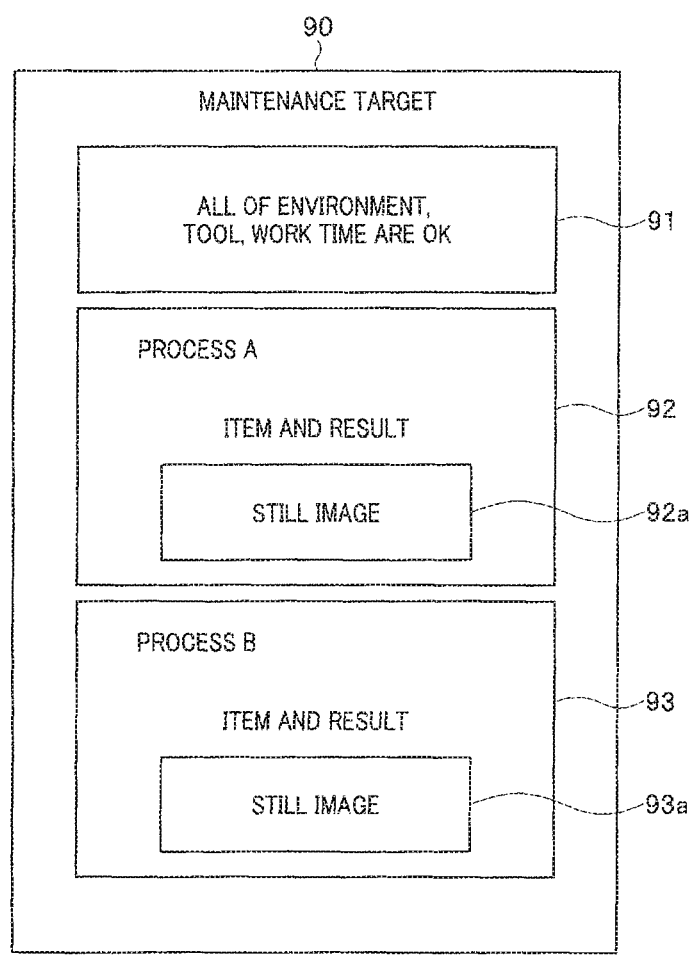
FIG. 9 is an explanatory diagram for explaining content recorded in an evidence recording section.

Subsequently, operation in the embodiment configured as explained above is explained with reference to FIGS. 6 to 9. FIG. 6 is a flowchart for explaining operation in the first embodiment. FIG. 7 is an explanatory diagram showing an example of work performed using the wearable terminal device. FIG. 8 is an explanatory diagram for explaining a virtual image of an electronic video during work. FIG. 9 is an explanatory diagram for explaining content recorded in the evidence recording section 15.

The wearable terminal device 10 in the embodiment can be used for work support concerning various kinds of work. In the following explanation, the operation in the embodiment is explained with reference to maintenance work (instrument cleaning and sterilization work) as an example of the work.

An operator 80 shown in FIG. 7 wears the wearable terminal device 10 on a head and performs work. FIG. 7 shows a state of the instrument cleaning and sterilization work. The operator 80 performs work for cleaning and sterilizing a used surgical instrument, which is a medical instrument, and the pipe 65, which is a treatment instrument, using the brush 66. Note that FIG. 7 shows an example in which the light guide section 13b of the wearable terminal device 10 forms a virtual display visual field in a left eye of the operator 80 and the image pickup section 12 is configured to be able to move with respect to the wearable terminal device 10.

A work bench 70 includes a cleaning tank 70a. Further, a faucet 73 is set above the cleaning tank 70a. When a handle 73a of the faucet 73 is turned in a plug opening direction, flowing water 74 flows out from a flowing water port 73b.

The operator 80 brushes and cleans a maintenance target instrument (the pipe 65) with cleaning liquid (e.g., water) stored in the cleaning tank 70a using a predetermined tool (the brush 66).

An optical axis of a lens of the image pickup section 12 faces the cleaning tank 70a side. Hands of the operator 80 are also included in an image pickup range of the image pickup section 12. In step S1 in FIG. 6, an image of a state during the cleaning work is picked up by the image pickup section 12. The image pickup section 12 is capable of performing image pickup at a relatively wide angle. An image of a portion in a wide range including the hands of the operator 80 is picked up during the work. The picked-up image is given to the observation-target-range determining section 11c. An observation necessary range is determined. The observation-target-range determining section 11c is capable of determining an observation necessary range from the picked-up image. However, in order to further improve determination accuracy, for example, the holding-up act may be added to determination conditions for an observation necessary range. In this case, the operator 80 performs a holding-up act for disposing a work target, which the operator 80 desires to enlarge and display, in a predetermined position of the image pickup range of the image pickup section 12.

In this case, image data acquired by the wearable terminal device 10 is, for example, an image shown in FIG. 8. A picked-up image 84 shown in FIG. 8 indicates that, while the operator 80 is holding the pipe 65 with a left hand 80L and performing brushing and cleaning work using the brush 66 held by a right hand 80R, the operator 80 performs a holding-up act and disposes the pipe 65 and the brush 66 in the predetermined position in the image pickup range of the image pickup section 12. For example, in the example shown in FIG. 7, the operator 80 performs the holding-up act by slightly turning the face downward or slightly lifting the left and right hands 80L and 80R.

The observation-target-range determining section 11c determines presence or absence of the holding-up act through an image analysis for a picked-up image (step S2). If an image of a state of the holding-up act is picked up like the picked-up image 84 shown in FIG. 8, the observation-target-range determining section 11c shifts the processing to step S3 and determines an observation necessary range. For example, the observation-target-range determining section 11c determines an observation necessary range using an inference engine acquired by the machine learning. The observation-target-range determining section 11c gives information concerning the observation necessary range to the display control section 11b. In step S4, the display control section 11b gives an enlarged image 86 obtained by enlarging an image portion of the observation necessary range to the display section 13. The display section 13 causes the light guide section 13b to display a virtual image based on the enlarged image 86 in the virtual display visual field of the left eye of the operator 80.

The operator 80 can surely confirm a state and the like of the work with the enlarged image 86 displayed in the virtual display visual field. Subsequently, the control section 11 gives the picked-up image 84 and the enlarged image 86 to the evidence recording section 15 and records the picked-up image 84 and the enlarged image 86 (step S5). The enlarged image 86 is useful for evidence recording as well.

FIG. 9 shows an example of recording content for each maintenance target recorded in the evidence recording section 15. Recording information 91 includes information concerning an environment of maintenance, a tool, and a work time. The environment of maintenance is information concerning a place for performing the work and indicates whether the place is in a state of an environment suitable for cleaning and sterilizing work for instruments. Note that, in a normal case, an exclusive maintenance environment (room, table, etc.) is prepared.

Information 92 and information 93 are respectively information concerning a process A and information concerning a process B. Both of the information 92 and the information 93 include work items and information concerning results of the work items. Further, in the embodiment, the information 92 and the information 93 respectively include still images 92a and 93a. The still images 92a and 93a are, for example, images acquired according to necessity during work such as the picked-up image 84 and the enlarged image 86 shown in FIG. 8.

Subsequently, the work determining section 11d compares the image data acquired by the image pickup section 12 and data corresponding to the image data stored in the DB 16. The work determining section 11d determines, with the comparison, whether work performed by the operator 80 is correct (specified) work or whether a work state is satisfactory (step S6).

When determining that the work state is satisfactory, in step S7, the control section 11 displays, in the virtual display visual field, a virtual image indicating OK and returns the processing to step S1. When determining that the work state is not satisfactory, the control section 11 shifts the processing to step S8, causes the guide section 11f to display predetermined information concerning predetermined warning display, guide display, and the like as a virtual image in the virtual display visual field, and thereafter returns the processing to step S4.

When determining in step S2 that the operator 80 is not performing the holding-up act, the control section 11 shifts the processing to step S9 and determines whether it is necessary to display the information such as the warning display, the guide display, and the like. When it is necessary to display the information, in step S10, the control section 11 displays the warning and the guide display as a virtual image in the virtual display visual field and thereafter returns the processing to step S1. When determining that it is unnecessary to display the information such as the warning display and the guide display, the control section 11 returns the processing to step S1 without performing these displays. Note that the control section 11 may output a warning and a guide by voice.

In this way, in the embodiment, by automatically determining details of work, which the operator is considered desiring to observe, and displaying an enlarged image of the details, it is possible to facilitate confirmation of the details of the work and make it possible to effectively support the work. Consequently, even in a work environment or the like in which the optical axis of the lens of the image pickup section deviates with respect to a hand point of the operator, that is, a point in which a work target member or the like is present, it is possible to display the work target member in a sufficiently large size. It is easy to confirm the work target member.

(Modification)

In the embodiment, since the orientation of the face and the orientation of the visual line are different from each other, the angle of view of the image pickup section 12 is set to the wide angle such that the observation necessary range is surely included in the picked-up image of the image pickup section 12. However, when the observation necessary range is located at an end portion of the image pickup range of the image pickup section 12, quality of the enlarged image is sometimes deteriorated by distortion or the like of the optical system of the image pickup section 12. Therefore, it is conceivable to change an image pickup direction of the image pickup section 12 such that the observation necessary range is located substantially in the center of the image pickup range of the image pickup section 12.

Figure 10:
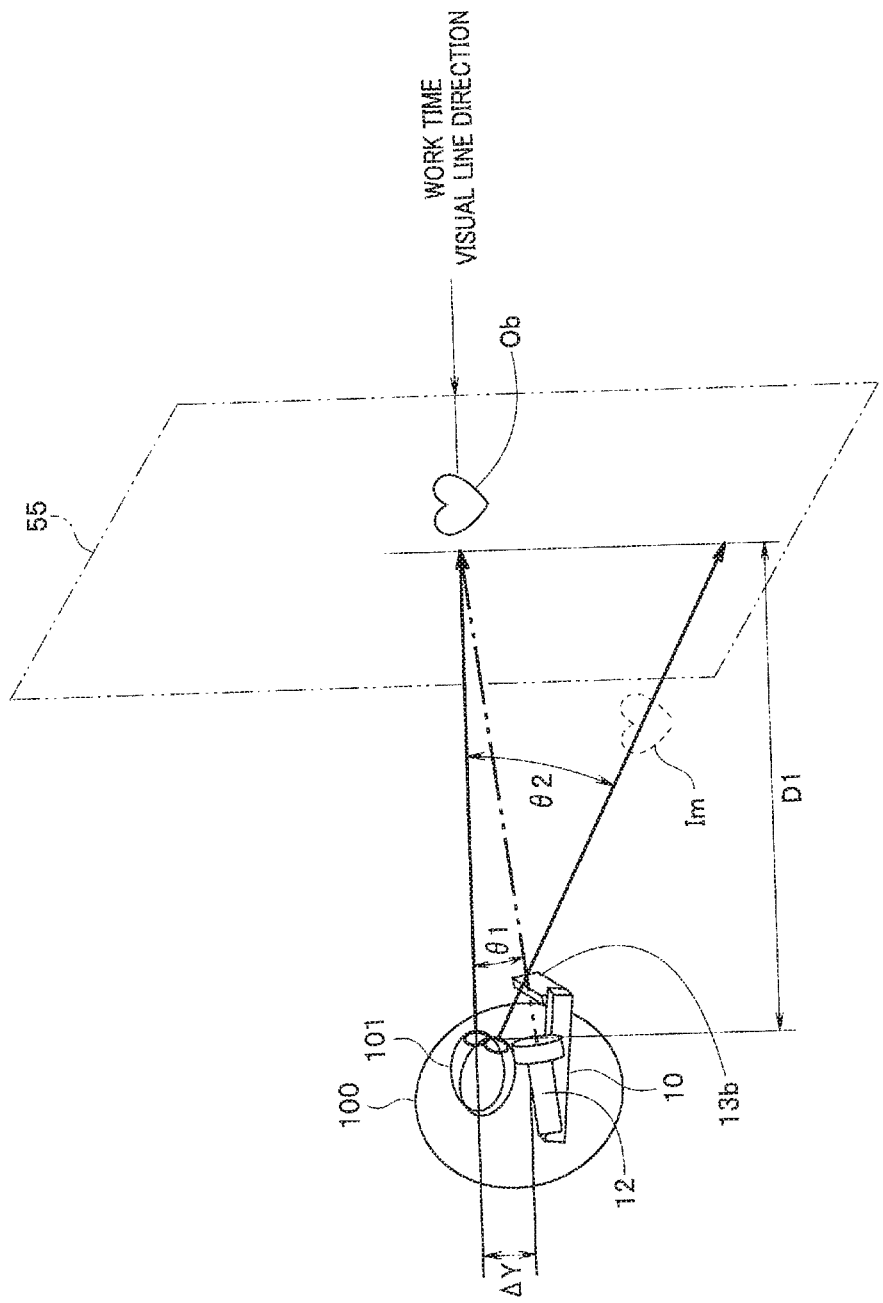
FIG. 10 is an explanatory diagram for explaining a relation between a visual line and an image pickup direction.
Figure 11:
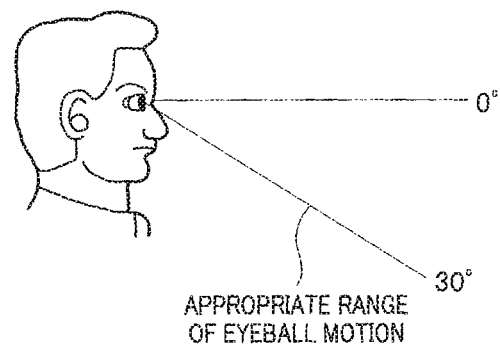
FIG. 11 is an explanatory diagram for explaining the relation between the visual line and the image pickup direction.

FIGS. 10 and 11 are explanatory diagrams for explaining a relation between a visual line and an image pickup direction. In FIG. 10, in the wearable terminal device 10, the image pickup section 12 is configured to be freely movable. It is assumed that an object Ob, which is a work target of a user 100, is located in a position away from a right eye 101 in a horizontal direction by a distance D1. On the other hand, it is assumed that a virtual display region is located on a downward side of a visual field and, in order to confirm a virtual image Im of the virtual display region, the user 100 directs a visual line of the right eye 101 downward. Note that a parallax in a vertical direction between the right eye 101 and the lens of the image pickup section 12 is represented as ΔY. In this case, in order to display an image of the object Ob substantially a center of the virtual display region, it is necessary to direct the image pickup direction of the image pickup section 12 upward by (θ2+θ1) with respect to an angle θ2 of the eye based on the horizontal direction and locate the object Ob in substantially a center of the camera visual field 55.

However, the user 100 can change a visual line direction by the right eye 101 without changing an orientation of a face. The angle θ2 changes according to content of work, an environment, an operator, or the like. However, it is said that an appropriate range of an eyeball motion is 0 degree (level) to 30 degrees downward as shown in FIG. 11. Therefore, the image pickup section 12 is desirably capable of changing an image pickup range to include at least the range.

FIGS. 12A to 12D are explanatory diagrams showing examples of configurations capable of changing the image pickup direction of such an image pickup section 12. In FIGS. 12A to 12D, the same components as the components shown in FIG. 2 are denoted by the same reference numerals and signs and explanation of the components is omitted.

Figure 12A:
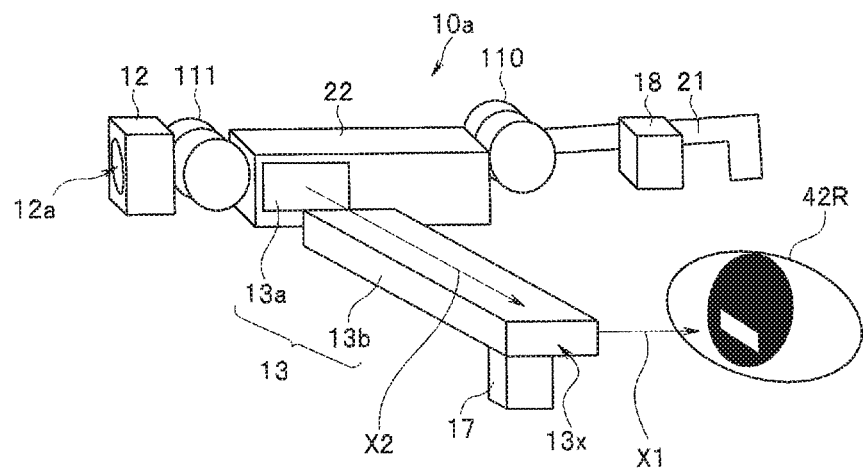
FIG. 12A is an explanatory diagram showing an example of a configuration capable of changing an image pickup direction of an image pickup section.

As shown in FIG. 12A, a wearable terminal device 10a is different from the wearable terminal device 10 shown in FIG. 2 in that first and second turning sections 110 and 111 configured by hinges and the like are provided. In the wearable terminal device 10a, the image pickup section 12 is configured to be able to move. The first turning section 110 is disposed between the eyeglass frame 21 and the circuit housing section 22. The first turning section 110 supports the eyeglass frame 21 and the circuit housing section 22 relatively turnably along a turning axis. Similarly, the second turning section 111 is disposed between the circuit housing section 22 and the image pickup section 12. The second turning section 111 supports the circuit housing section 22 and the image pickup section 12 relatively turnably along the turning axis.

Figure 12B:
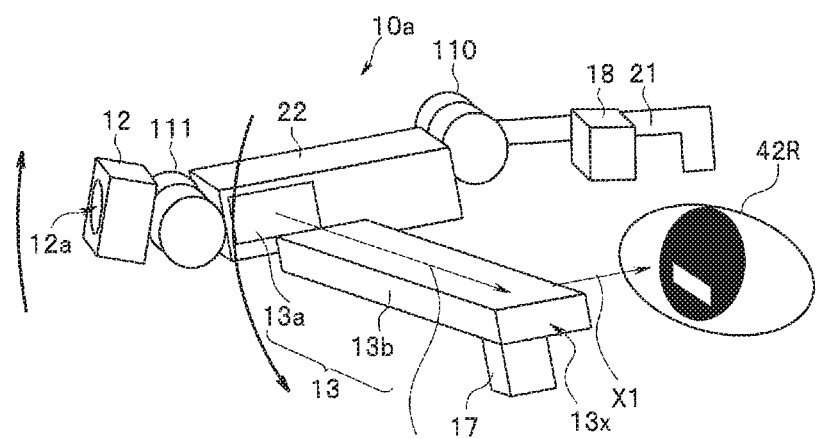
FIG. 12B is an explanatory diagram showing an example of a configuration capable of changing the image pickup direction of the image pickup section.

FIG. 12B shows an example in which orientations of the light guide section 13b and the image pickup section 12 of the wearable terminal device 10a shown in FIG. 12A are changed. In other words, in FIG. 12B, as indicated by arrows, by the first and second turning sections 110 and 111, the circuit housing section 22 is directed to a downward side with respect to an orientation of the eyeglass frame 21, that is, an orientation of the face to direct a direction of the light guide section 13b with respect to the right eye 42R to a downward side and, at the same time, an orientation of the image pickup lens 12a of the image pickup section 12 is directed upward with respect to the circuit housing section 22.

By adopting the wearable terminal device 10a shown in FIG. 12A, it is possible to freely change, in an up-down direction of the face, the direction of the virtual display region with respect to the eye and the image pickup direction of the image pickup section 12. In the example shown in FIG. 10, it is also possible to relatively easily display an image of the object Ob in the observation necessary range substantially in the center of the virtual display region.

Figure 12C:
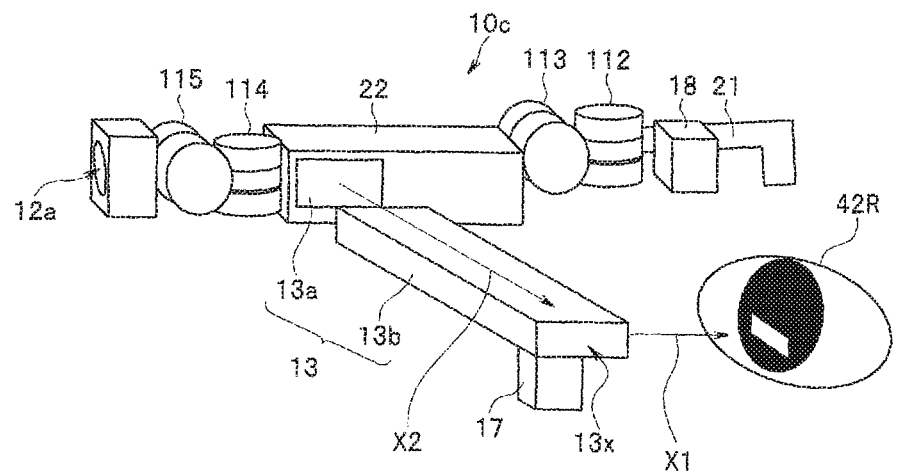
FIG. 12C is an explanatory diagram showing an example of a configuration capable of changing the image pickup direction of the image pickup section.

FIG. 12C shows a wearable terminal device 10c that makes it possible to freely change the direction of the virtual display region with respect to the eye and the image pickup direction of the image pickup section 12 not only in the up-down direction of the face but also in a left-right direction of the face. As shown in FIG. 12C, the wearable terminal device 10c is different from the wearable terminal device 10 shown in FIG. 2 in that turning sections 112 and 113 and turning sections 114 and 115 configured by hinges and the like and coupled to each other are provided. In the wearable terminal device 10c as well, the image pickup section 12 is configured to be able to move. The coupled turning sections 112 and 113 are disposed between the eyeglass frame 21 and the circuit housing section 22. The turning sections 112 and 113 support the eyeglass frame 21 and the circuit housing section 22 relatively turnably along, for example, respective turning axes orthogonal to each other of the turning sections 112 and 113. Similarly, the turning sections 114 and 115 are disposed between the circuit housing section 22 and the image pickup section 12. The turning sections 114 and 115 support the circuit housing section 22 and the image pickup section 12 relatively turnably along, for example, respective turning axes orthogonal to each other of the turning sections 114 and 115.

Therefore, in the wearable terminal device 10c, a direction of the light guide section 13b with respect to the right eye 42R can be freely changed in the up-down direction and the left-right direction with respect to the orientation of the eyeglass frame 21 (the orientation of the face) by the turning sections 112 and 113. An orientation of the image pickup lens 12a of the image pickup section 12 can be freely changed in the up-down direction and the left-right direction with respect to the circuit housing section 22 by the turning sections 114 and 115.

Figure 12D:
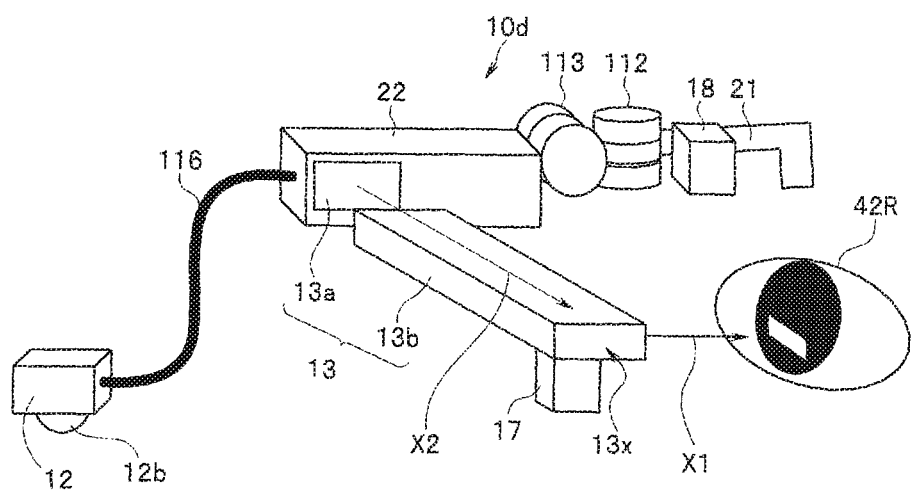
FIG. 12D is an explanatory diagram showing an example of a configuration capable of changing the image pickup direction of the image pickup section.

Further, FIG. 12D shows an example in which a degree of freedom of the image pickup direction of the image pickup section 12 is further improved. A wearable terminal device 10d shown in FIG. 12D is different from the wearable terminal device 10c shown in FIG. 12C in that a cable 116 is adopted instead of the turning sections 114 and 115. The image pickup section 12 is configured to be able to move from the circuit housing section 22 and connected by the circuit section in the circuit housing section 22 and the cable 116. The cable 116 is configured by a flexible material and capable of freely setting a disposition position and an orientation of the image pickup section 12.

Therefore, in the wearable terminal device 10d, the disposition position and the image pickup direction of the image pickup section 12 can be freely changed with respect to the circuit housing section 22 by the cable 116. Further, the image pickup section 12 is capable of picking up an image of an entire circumference with a photographing lens 12b. For example, the image pickup section 12 is capable of picking up an image of an image pickup range in an opposite direction of the visual line direction, that is, an opposite direction of the orientation of the face of the user. The image pickup section 12 is also capable of enlarging and displaying, in the virtual display region of the right eye 42R of the user, as an observation necessary range, an image portion of an object present behind the user.

Note that, it is also possible to configure the wearable terminal device 10d to switch, using a not-shown image pickup section that picks up an image in the visual line direction of the user besides the image pickup section 12, a picked-up image to a picked-up image determined as an observation necessary range of picked-up images of the two image pickup sections and cause the virtual display region to display the picked-up image. In the example shown in FIG. 12D, the wearable terminal device 10d may be configured to transmit a picked-up image by radio instead of the cable 116.

In this way, in the modification, irrespective of the orientation of the face and the orientation of the visual line, it is possible to change the image pickup direction of the image pickup section 12 such that an observation necessary range is surely included in, for example, substantially a center in a picked-up image of the image pickup section 12. Consequently, it is possible to display a virtual image of the observation necessary range with high quality.

In the examples shown in FIGS. 12A to 12D, the example is explained in which both of the mechanism for changing the direction of the virtual display region with respect to the eye and the mechanism for changing the image pickup direction of the image pickup section 12 are provided. However, only one of the mechanisms may be provided.

Second Embodiment

Figure 13:
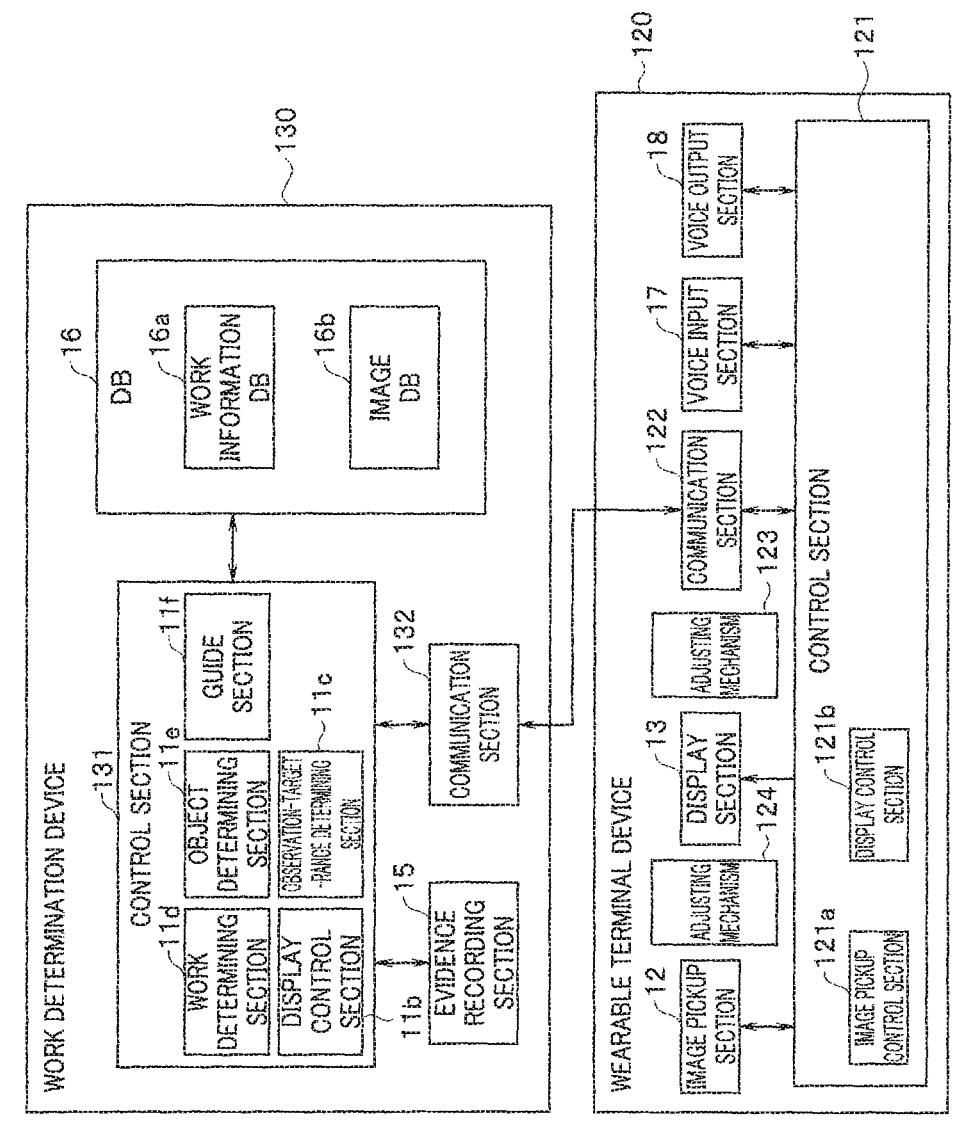
FIG. 13 is a block diagram showing a second embodiment of the present invention.

FIG. 13 is a block diagram showing a second embodiment of the present invention. In FIG. 13, the same components as the components shown in FIG. 1 are denoted by the same reference numerals and signs and explanation of the components is omitted.

The embodiment is applied to a work supporting system that can perform work support for surely executing a predetermined series of work including a plurality of kinds of work according to a specified procedure and a specified method and perform evidence recording concerning the executed respective kinds of work. In the first embodiment, the example is explained in which the wearable terminal device 10 determines an observation necessary range and displays an enlarged image of the observation necessary range in the virtual display region. However, a computational amount necessary for the determination of an observation necessary range is considered to be extremely large. Therefore, in the embodiment, a center apparatus (a work determination apparatus) of a work supporting system carries out the determination of an observation necessary range.

In FIG. 13, a wearable terminal device 120 is different from the wearable terminal device 10 shown in FIG. 1 in that a control section 121 is adopted instead of the control section 11, the evidence recording section 15 and the DB 16 are omitted, and a communication section 122 and adjusting mechanisms 123 and 124 are adopted.

The control section 121 may be configured by a processor including a CPU and operate according to a program stored in a not-shown memory and control the respective sections or may realize a part or all of functions with a hardware electronic circuit. The control section 121 does not need to perform determination of an observation necessary range and includes an image pickup control section 121a that drives the image pickup section 12 and a display control section 121b that controls display of the display section 13. Note that the image pickup control section 121a and the display control section 121b respectively have the same functions as the functions of the image pickup control section 11a and the display control section 11b shown in FIG. 1.

The adjusting mechanism 123 has, for example, the same function as the function of the turning sections 112 and 113 shown in FIG. 12C. The adjusting mechanism 124 has, for example, the same function as the function of the turning sections 114 and 115 shown in FIG. 12C. In other words, the adjusting mechanism 123 freely changes a direction of the light guide section 13b with respect to the eye in the up-down direction and the left-right direction with respect to the orientation of the eyeglass frame 21 (the orientation of the face). The adjusting mechanism 124 freely changes the orientation of the image pickup lens 12a of the image pickup section 12 in the up-down direction and the left-right direction with respect to the circuit housing section 22. Note that the adjusting mechanisms 123 and 124 may be absent.

The communication section 122 performs communication with the work determination apparatus 130 to perform transmission and reception of information. A control section 131 is provided in the work determination apparatus 130. A communication section 132 is also provided in the work determination apparatus 130. The communication section 132 performs communication with the communication section 122 of the wearable terminal device 120. Consequently, the control section 121 of the wearable terminal device 120 and the control section 131 of the work determination apparatus 130 are capable of exchanging information each other.

The control section 131 may be configured by a processor including a CPU and operate according to a program stored in a not-shown memory and control the respective sections or may realize a part or all of functions with a hardware electronic circuit. The control section 131 includes the observation-target-range determining section 11c, the work determining section 11d, the object determining section 11e, the guide section 11f, and the display control section 11b for generating display control information for determination of an observation necessary range and enlarged display of the observation necessary range.

The communication section 122 of the wearable terminal device 120 is controlled by the control section 121 and can transmit a picked-up image obtained by the image pickup section 12 performing image pickup to the control section 131 via the communication section 132. The control section 131 can determine an observation necessary range based on the picked-up image picked up by the image pickup section 12 and transmit display control information of a result of the determination to the control section 121 via the communication sections 132 and 122. The display control section 121b of the control section 121 is configured to cause, based on the display control information, the display section 13 to display an image obtained by enlarging the observation necessary range of the picked-up image picked up by the image pickup section 12.

The work determination apparatus 130 includes the evidence recording section 15 and the DB 16. Note that, in an example shown in FIG. 13, an example is explained in which the evidence recording section 15 of the work determination apparatus 130 performs evidence recording. However, a not-shown recording section may be provided in the wearable terminal device 120 to perform the evidence recording.

In the above explanation, the example is explained in which the enlarged image of the observation necessary range is displayed on the display section 13 of the wearable terminal device 120. However, a display section may be provided in the work determination apparatus 130 to cause the display section to display the enlarged image of the observation necessary range.

Figure 15:
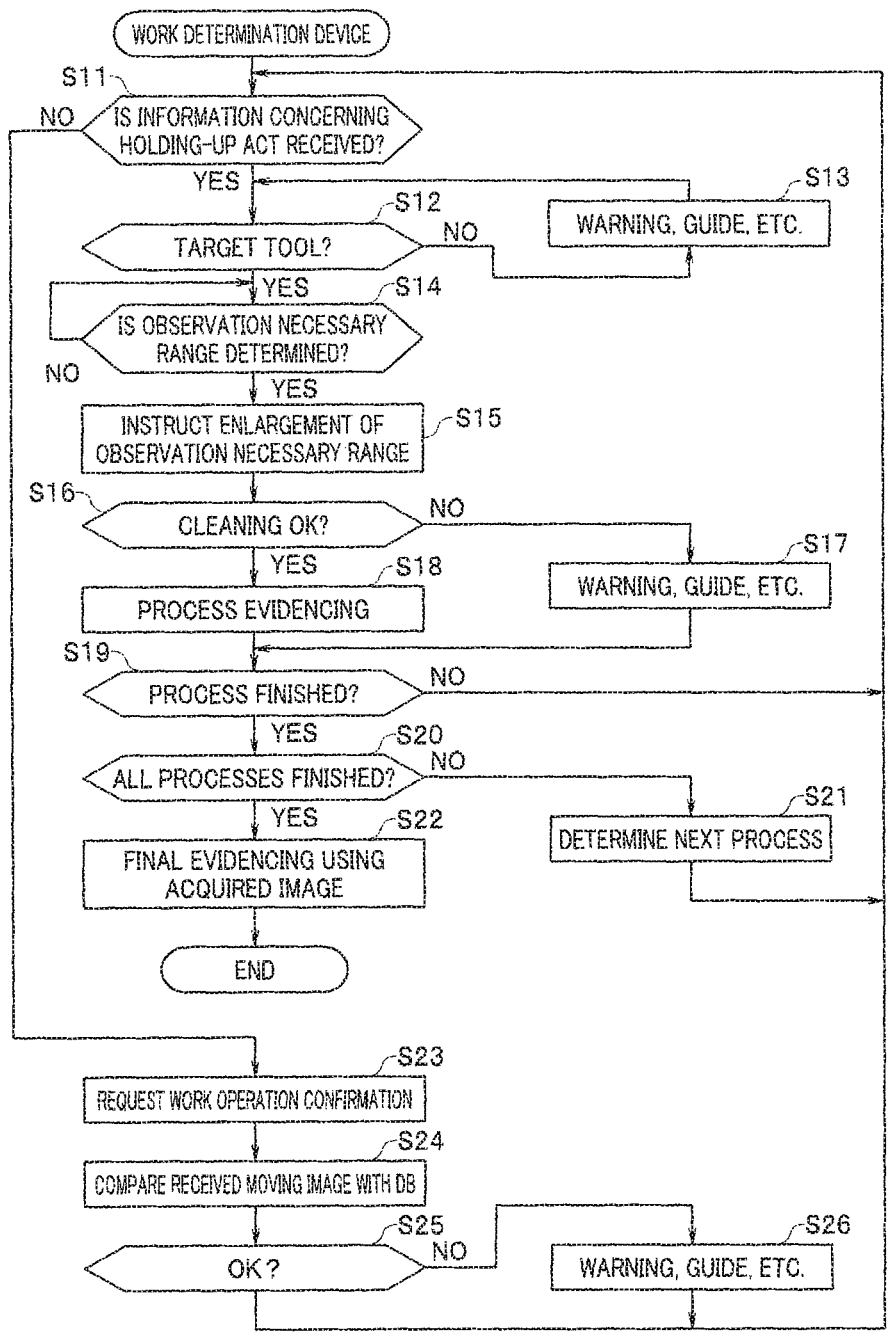
FIG. 15 is a flowchart showing operation of a work determination apparatus.

Operation in the embodiment configured as explained above is explained with reference to FIGS. 14 to 16. FIG. 14 is an explanatory diagram showing an example of information recorded in the DB 16. FIG. 15 is a flowchart showing operation of the work determination apparatus. FIG. 16 is a flowchart showing operation of the wearable terminal device.

In the following explanation, action in performing predetermined maintenance work (instrument cleaning and sterilization work) using the work supporting system shown in FIG. 13 is explained. Note that, in the following explanation, confirmation of a tool used for work is performed by detecting holding-up act. However, the holding-up act is not used for determination of an observation necessary range. In the following explanation, an example is explained in which an enlarged image of an observation necessary range is displayed during cleaning. However, it is evident that an enlarged image of an observation necessary range can be displayed at desired timing during work. For example, an observation necessary range may be determined to display an enlarged image during the confirmation of the tool. In the following explanation, an example is explained in which the work determination apparatus 130 determines an observation necessary range and instructs the observation necessary range to the wearable terminal device 120. However, the wearable terminal device 120 may determine an observation necessary range.

In step S31 in FIG. 16, the image pickup section 12 picks up, as appropriate, an image of situations of a plurality of kinds of work sequentially performed by an operator. The picked-up image picked up by the image pickup section 12 is always transmitted to the work determination apparatus 130 by the communication section 122 and supplied to the control section 131 by the communication section 132. The control section 131 of the work determination apparatus 130 performs, based on the received picked-up image and various kinds of information accumulated in the DB 16 in advance, determination of a plurality of confirmation items specified according to work content set as a target, for example, determination of a maintenance target instrument, determination of a type and the like of a tool in use, and determination of work acts (brushing, water cleaning, wiping, chemical spraying, etc.).

FIG. 14 shows an example of a specific information content included in the DB 16. The example shown in FIG. 14 shows a database (a work information database) in which maintenance work in cleaning "scissors", which is a type of an instrument used for surgical operation, treatment, and the like, in manual operation of the operator after using the "scissors" in surgical operation, treatment, or the like (hereinafter referred to as scissor cleaning and sterilization work) is assumed.

As shown in FIG. 14, a maintenance target field [A] is an instrument name set as a target of maintenance. In the example, "target 1: scissors" is recorded and indicates scissors cleaning and sterilization work. Note that another instrument name is written in "target 2: ○○○". However, detailed illustration other than information concerning "target 1" is omitted in FIG. 14.

In the work information database shown in FIG. 14, a work process field [B] lists examples of a plurality of kinds of work processes included in the maintenance work in order of work. Work processes included in the scissors cleaning and sterilization work are, for example, a "first process: brushing" process, a "second process: flowing water cleaning" process, a "third process: wiping" process, and a "fourth process: chemical sterilization" process.

The "first process: brushing" process is a process for performing brushing in a predetermined water tank or the like using a predetermined tool (a brush, etc.). The "second process: flowing water cleaning" process is a process for performing water cleaning in flowing water. The "third process: wiping" process is a process for performing wiping to wipe off water and stain using a predetermined tool (paper, cloth, etc.). The "fourth process: chemical sterilization" process is a process for performing sterilization using (spraying) a predetermined chemical (alcohol, etc.). Note that types and the number of processes that should be performed are different depending on target instruments.

In the work information database shown in FIG. 14, a work content field [C] lists, in work order, examples of a plurality of kinds of work included in the respective work processes. Kinds of work included in the "first process: brushing" process of the scissor cleaning and sterilization work are, for example, "tool confirmation" work serving as "first work", "first part brushing" work serving as "second work", and "second part brushing" work serving as "third work". Specific information of the respective kinds of work is recorded in the following work information field [D].

In the work information database shown in FIG. 14, specific information (e.g., character data and image data) clearly indicating the respective kinds of work is recorded in the work information field [D]. Note that, in FIG. 13, the image database 16b is separately provided besides the work information database 16a. However, as a configuration of the database 16, the work information database 16a and the image database 16b may be integrated.

The information of the work information field [D] indicates information acquired by the wearable terminal device 120. Note that wearable terminal device information [D] is mainly work information represented by a movie. The "tool confirmation" work serving as the "first work" included in the "first process: brushing" process is confirmation work for a tool used in the work process. Therefore, as the wearable terminal device information [D], movie data or the like recording an act of holding up a tool over a front surface (in the image pickup range) of the image pickup section 12 is recorded.

When the operator performs the "tool confirmation" work, the following work is performed. First, the operator holds a predetermined tool used in work to be performed and performs an act of holding up the tool over the front surface (in the image pickup range) of the image pickup section 12. When the holding-up act is performed in step S32, in step S33, the control section 121 of the wearable terminal device 120 causes the image pickup section 12 to pick up an image of the holding-up act, transfers the picked-up image to the work determination apparatus 130, and causes the work determination apparatus 130 to record the picked-up image as a movie.

The control section 131 of the work determination apparatus 130 executes predetermined image determination processing based on received movie data. For example, when detecting the act of holding up the tool in step S11, in step S12, the control section 131 determines whether the tool, the image of which is picked up, is a target instrument. When the tool, the image of which is picked up, is not the target tool, the control section 131 shifts the processing to step 13, transmits information for warning and guide to the wearable terminal device 120, and returns the processing to step S12.

When receiving, in step S34 following step S33, the information for warning and guide indicating that the tool, the holding-up act of which is performed, is not the target instrument, in step S35, the control section 121 of the wearable terminal device 120 displays an instruction and a warning concerning necessary adjustment and returns the processing to step S33. When the operator performs the act of holding up a tool that the operator considers correct, a picked-up image of the tool is transmitted to the work determination apparatus 130 by the control section 121. Determination of the target instrument is performed.

When the tool, the image of which is picked up, is the target instrument, the control section 131 shifts the processing from step S12 to step S14 and performs determination of an observation necessary range. Note that information indicating that the tool, the image of which is picked up, is the target instrument is transmitted to the control section 121 of the wearable terminal device 120 by the control section 131.

The observation-target-range determining section 11c of the control section 131 performs determination of an observation necessary range and generates a display control signal for enlarging and displaying an observation necessary range of a result of the determination (step S15).

The display control information is supplied to the control section 121 of the wearable terminal device 120 via the communication sections 132 and 122. When receiving the information indicating that the tool, for which the holding-up act is performed, is the target instrument in step S34, in next step S36, the control section 121 comes into a reception standby state for the display control information indicating the observation necessary range. When receiving the display control information, the control section 121 shifts the processing to step S37 and causes the display control section 121b to display an enlarged image of the observation necessary range on the display section 13. The control section 121 transmits the enlarged image of the observation necessary range obtained by the image pickup section 12 to the control section 131 of the work determination apparatus 130 via the communication sections 122 and 132.

In step S16 following step S15, the control section 131 of the work determination apparatus 130 determines, based on the received enlarged image and the information of the DB 16, whether cleaning work is correctly performed. When the cleaning work is not correctly performed, the control section 131 shifts the processing to step S17, transmits information for warning and guide to the wearable terminal device 120, and shifts the processing to step S19.

In step S38 following step S37, the control section 121 of the wearable terminal device 120 determines whether the work determination apparatus 130 satisfactorily performs work. When receiving information such as warning display and guide display, in step S39, the control section 121 displays an instruction and a warning concerning necessary adjustment and returns the processing to step S36.

On the other hand, when determining in step S16 that the cleaning work is correctly performed, the control section 131 of the work determination apparatus 130 transmits information indicating that the work is correctly performed to the control section 121 of the wearable terminal device 120, shifts the processing to step S19, and performs process evidencing. In other words, the control section 131 performs evidence recording for recording acquire image data or the like in a predetermined faun. When receiving, in step S38, a determination result indicating that the work is satisfactorily performed, the control section 121 of the wearable terminal device 120 causes the display section 13 to display OK display indicating that the work is satisfactorily performed and returns the processing to step S31.

In step S19 following step S18, the control section 131 of the work determination apparatus 130 confirms whether the process is finished. The confirmation is performed by referring to, for example, the database 16. When confirming that the process is finished, the control section 131 proceeds to processing in next step S20. When the process end is not confirmed, that is, when the process has not ended and next work is present, the control section 131 returns the processing to step S11.

In step S20, the control section 131 confirms whether all the processes of the work are finished. When confirming the end of all the processes, the control section 131 proceeds to processing in next step S22. When not confirming the end of all the processes, the control section 131 proceeds to processing in step S21. After determining a next process in step S21, the control section 131 returns the processing to step S11.

When confirming the end of all the processes in step S20, the control section 131 shifts the processing to step S22 and executes final evidencing processing. The final evidencing processing is, for example, processing for filing an acquired plurality of image data or the like as a predetermined position file and creating a checklist or the like created based on an OK signal outputted in the processing in step S16. Thereafter, the control section 131 ends all the kinds of processing and returns to the standby state.

Note that, when determining in step S11 that the information concerning the holding-up act is not received, the control section 131 shifts the processing to step S23 and transmits a work confirmation request instruction to the wearable terminal device 120. The work confirmation request instruction is an instruction for requesting transmission of movie data acquired by the wearable terminal device 120 after the transmission and reception of the information concerning the holding-up act.

In step S41, the control section 121 of the wearable terminal device 120 confirms whether the work confirmation request instruction is received. When receiving the work confirmation request instruction, the control section 121 shifts to step S42 and transmits the acquired movie data to the work determination apparatus 130.

In step S24 following step S23, the control section 131 of the work determination apparatus 130 receives the movie data transmitted from the wearable terminal device 120. The control section 131 compares the received movie data and corresponding data accumulated in the database 16. The control section 131 confirms, based on the acquired movie data, whether the work performed by the operator is correct (specified) work. In next step S25, when there is no problem in a result of the comparison, that is, when confirming that the work (for acquiring the movie) performed by the operator is correct (specified) work (when the work is OK), the control section 131 returns the processing to step S11. When the work is not OK, the control section 131 shifts the processing to step S26. In step S26, the guide section 11f of the control section 131 transmits predetermined information concerning predetermined warning display, guide display, and the like to the wearable terminal device 120 and thereafter returns the processing to step S11.

In step S43 following step S42, the control section 121 of the wearable terminal device 120 confirms whether the information such as the warning display and the guide display is received. When confirming the reception of the information, in step S44, the control section 121 controls the display section 13, the voice output section 18, and the like and executes warning display, guide display, and the like of a predetermined form and thereafter returns the processing to step S31. Note that, when the information such as the warning display and the guide display is not continued, the control section 121 returns the processing to step S31.

In this way, by causing the wearable terminal device 120 and the work determination apparatus 130 to act in cooperation, the work supporting system can perform work support for surely executing a predetermined series of work including a plurality of kinds of work according to a specified work procedure and a specified work method. In this case, for example, an important part for work can be determined as an observation necessary range and enlarged and displayed, and work mistakes can be prevented.

A predetermined act during work, a tool in use, and a situation such as an ambient environment are recorded as images and evidenced. Therefore, it is possible to guarantee, after the work, whether predetermined work is surely performed as specified.

It is possible to support the operator to perform sure work by effectively utilizing image data acquired during the work, eliminating work mistakes based on an acquired plurality of image data and work information of a database accumulated in advance, and, when a work mistake occurs, warning the operator and informing a correct procedure.

Further, in the explanation in the respective embodiments of the present invention, the image pickup device housed in the temple portion of the wearable terminal device is used as the device for photographing in order to photograph the same region as the visual field. However, any image pickup device may be adopted if the image pickup device can acquire an image that requires confirmation of a state and the like of work. If a setting place is not a problem, the device for photographing may be a lens-type camera, a digital single lens reflex camera, or a compact digital camera, may be a camera for moving images such as a video camera or a movie camera, or, naturally, may be a camera incorporated in a cellular phone, a portable information terminal (PDA: personal digital assistant) such as a smartphone, and the like. The device for photographing may be an industrial or medical optical device such as an endoscope or a microscope, a monitoring camera, a vehicle-mounted camera, or a stationary camera, for example, a camera attached to a television receiver or a personal computer.

Further, the portions described as the sections or units in the embodiments may be dedicated circuits, may be configured by combining a plurality of general-purpose circuits, or may be configured by combining, according to necessity, processors such as microprocessors or CPUs that perform operation according to software programmed in advance or sequencers. It is also possible to design an external apparatus to undertake a part or the entire control of the portions. In this case, a wired or wireless communication circuit is interposed. For simplification, a communication section is not specially mentioned. However, an embodiment is also assumed in which the characteristic processing and supplementary processing of the application are performed by an external apparatus such as a server or a personal computer. The application covers an embodiment in which a plurality of apparatuses cooperate to achieve the characteristics of the present invention. Bluetooth (registered trademark), Wi-Fi (registered trademark), a telephone line, or the like is used for communication in the case. The communication in the case may be performed by a USB or the like. A dedicated circuit, a general-purpose circuit, and a control section may be integrated and configured as an ASIC. Such an apparatus or system may have a function of, for example, performing some approach to the user or changing an angle of a component. A mechanism of the apparatus is configured by various actuators and, according to necessity, configured by a coupling mechanism. The actuators are actuated by a driver circuit. The driver circuit is also controlled by a microprocessor, a microcomputer, an ASIC, or the like according to a specific program. Detailed correction, adjustment, and the like of such control may be performed according to information outputted by various sensors and peripheral circuits of the sensors.

The present invention is not directly limited by the respective embodiments. In an implementation stage, constituent elements can be modified and embodies without departing from the gist of the present invention. Various inventions can be formed by appropriate combinations of a plurality of constituent elements disclosed in the embodiments. For example, several constituent elements among all the constituent elements described in the embodiments may be deleted. Further, the constituent elements described in different embodiments may be combined as appropriate.

Note that, even if the operation flows in the claims, the specification, and the drawings are explained using "first, "subsequently", and the like for convenience, this does not mean that it is essential to carry out the operation in the order. It goes without saying that portions not affecting the essence of the invention in the respective steps configuring the operation flows can be omitted as appropriate.

Most of the controls and the functions mainly explained in the flowcharts among the techniques explained herein can be set by a program. The controls and the functions explained above can be realized by a computer reading and executing the program. The entire or a part of the program can be recorded or stored as a computer program product in a portable medium such as a flexible disk, a CD-ROM, or a nonvolatile memory or a recording medium such as a hard disk or a volatile memory. The program can be distributed or provided via a portable medium or a communication line during product shipment. A user can easily realize the apparatuses in the embodiments by downloading the program via a communication network and installing the program in a computer or installing the program in the computer from a recording medium.

What is claimed is:

1. A head-mounted display apparatus comprising:
a display device configured to form a virtual display region by a virtual image of an electronic video in a visual field of a user;
an image pickup device configured to pick up an image of an image pickup range including a part or a whole of visual field of the user; and
a processor, wherein
the processor determines, with signal processing for a picked-up image by the image pickup device, an observation necessary range in the picked-up image and performs display control for displaying, in the virtual display region, an image portion of the observation necessary range in the picked-up image, and
the processor detects a fingertip of the user's left hand and a fingertip of the user's right hand and sets a range surrounded by the user's left hand fingertip and right hand fingertip as the observation necessary range.

2. A head-mounted display apparatus comprising:
a display device configured to form a virtual display region by a virtual image of an electronic video in a visual field of a user;
an image pickup device configured to pick up an image of an image pickup range including a part or a whole of visual field of the user;
at least one mechanism of a first mechanism configured to change a position of the virtual display region in the visual field of the user and a second mechanism configured to change an image pickup direction of the image pickup device, and
a processor, wherein
the processor determines, with signal processing for a picked-up image by the image pickup device, an observation necessary range in the picked-up image and performs display control for displaying, in the virtual display region, an image portion of the observation necessary range in the picked-up image,
the processor detects a fingertip of the user's left hand and a fingertip of the user's right hand and sets a range surrounded by the user's left hand fingertip and right hand fingertip as the observation necessary range, and the processor determines an act of holding-up the user's hands as a determination condition for the observation necessary range.

3. The head-mounted display apparatus according to claim 2, wherein the processor determines, as the observation necessary range, an image portion including a work object of the user.

4. The head-mounted display apparatus according to claim 2, wherein the processor determines a work object of the user through an image analysis for the picked-up image and determines, as the observation necessary range, an image portion including the work object of the user.

5. The head-mounted display apparatus according to claim 2, further comprising a work database including information concerning work of the user, wherein
the processor specifies a work object based on an image analysis for the picked-up image and information of the work database and determines, as the observation necessary range, an image portion including the specified work object.

6. The head-mounted display apparatus according to claim 2, wherein the processor performs, using a predetermined inference model, inference of the observation necessary range based on the inputted picked-up image.

7. An inspection supporting display system comprising:
a head-mounted display apparatus including:
a display device configured to form a virtual display region by a virtual image of an electronic video in a visual field of a user; and
an image pickup device configured to pick up an image of an image pickup range including a work target of the user; and
a processor, wherein
the processor determines, with signal processing for a picked-up image by the image pickup device, an observation necessary range including the work target in the picked-up image and performs display control for enlarging and displaying an image portion of the observation necessary range in the picked-up image, and
the processor detects a fingertip of the user's left hand and a fingertip of the user's right hand and sets a range surrounded by the user's left hand fingertip and right hand fingertip as the observation necessary range.

8. A display method comprising:
forming a virtual display region by a virtual image of an electronic video in a visual field of a user;
picking up an image of an image pickup range including a part or a whole of visual field of the user;
determining, with signal processing for a picked-up image acquired by the image pickup, an observation necessary range in the picked-up image;
performing display control for displaying, in the virtual display region, an image portion of the observation necessary range in the picked-up image, and
detecting a fingertip of the user's left hand and a fingertip of the user's right hand and setting a range surrounded by the user's left hand fingertip and right hand fingertip as the observation necessary range.

9. A non-transitory computer-readable recording medium recording a display program for causing a computer to:
form a virtual display region by a virtual image of an electronic video in a visual field of a user;
pick up an image of an image pickup range including a part or a whole of visual field of the user; determine, with signal processing for a picked-up image acquired by the image pickup, an observation necessary range in the picked-up image;
execute display control for displaying, in the virtual display region, an image portion of the observation necessary range in the picked-up image, and
detect a fingertip of the user's left hand and a fingertip of the user's right hand and set a range surrounded by the left hand fingertip and right hand fingertip as the observation necessary range.

* * * * *